UNITED STATES PATENT OFFICE.

THOMAS J. KELLY, OF MARIETTA, OHIO.

STAIN AND FILLER.

No. 845,793.　　　Specification of Letters Patent.　　　Patented March 5, 1907.

Application filed December 8, 1906. Serial No. 346,895.

*To all whom it may concern:*

Be it known that I, THOMAS J. KELLY, a citizen of the United States, residing at Marietta, in the county of Washington and State of Ohio, have invented certain new and useful Improvements in Stains and Fillers, of which the following is a specification.

My present invention consists in a compound for filling and staining wood preparatory to varnishing or the like.

To produce one gallon of this mixture, I take four and one-half pints of water and dissolve therein a sufficient amount and kind of color to produce the color desired. The water should be hot. To this I add one-half pint of alcohol, one and one-half pints glycerin, five pounds of silex, and one-half ounce of gum-arabic which has been dissolved in water. This produces a gallon of the mixture, which when applied to wood will stain and fill it at the same time. I have found by experiment the stated proportions to be most desirable, although these proportions may be varied.

This mixture does not raise the grain of the wood and will not fade. It has no odor and will dry hard in about five hours' time. It will produce the same shade on different woods, so that where several woods are used next to each other a uniform appearance can be produced. It can be used in a dipping-tank or applied with a brush, as may be desired. Any desired shade or color can be produced by the use of suitable coloring-matter. Burnt umber, cochineal, yellow ocher, lampblack, or any other coloring-matter which may be suitable to produce the required shade may be used, the particular coloring-matter not being essential to the invention. It should be kept (when not in use) in an air-tight package in order to preserve its quality unimpaired.

I claim as my invention—

1. A composition of matter forming a stain and filler, comprising water, alcohol, glycerin, silex and a gum.

2. A composition of matter forming a stain and filler, comprising water, alcohol, glycerin, silex, a gum, and suitable coloring-matter.

3. The combination, in a stain and filler for woods, of water, alcohol, glycerin, silex, and a gum in substantially the following proportions, viz: four and one-half pints water, one-half pint alcohol, one and one-half pints glycerin, five pounds silex, and one-half ounce of a gum.

4. A composition of matter comprising water, alcohol, glycerin, silex, and a gum in substantially the proportions of four and one-half pints water, one-half pint alcohol, one and one-half pints glycerin, five pounds silex, one-half ounce of a gum, and coloring-matter by which the same is given the desired tint.

In witness whereof I have hereunto set my hand and seal, at Marietta, Ohio, this 3d day of December, A. D. 1906.

THOMAS J. KELLY. [L. S.]

Witnesses:
F. A. METZGER,
F. M. McDONNELL.